US006203878B1

(12) United States Patent
Davis et al.

(10) Patent No.: US 6,203,878 B1
(45) Date of Patent: Mar. 20, 2001

(54) BULLETIN BOARD ACCESSORIES AND ACCESSORY ATTACHING MECHANISM

(75) Inventors: Bradley C. Davis, Irvine; Michael K. Boone, Laguna Beach, both of CA (US)

(73) Assignee: Boone International, Inc., Corona, CA (US)

( * ) Notice: Subject to any disclaimer, the term of this patent is extended or adjusted under 35 U.S.C. 154(b) by 0 days.

(21) Appl. No.: 09/404,052

(22) Filed: Sep. 22, 1999

Related U.S. Application Data

(63) Continuation of application No. 08/877,280, filed on Jun. 17, 1997, now Pat. No. 5,976,663, which is a continuation-in-part of application No. 08/526,707, filed on Sep. 11, 1995, now Pat. No. 5,658,635.

(51) Int. Cl.[7] .......... B32B 3/02

(52) U.S. Cl. .......... 428/83; 428/14; 428/99; 428/122; 428/582; 248/229.11; 248/229.26; 248/231.71; 248/311.2; 248/451; 224/270

(58) Field of Search .......... 428/83, 81, 13, 428/14, 99, 582, 122; 248/229.11, 311.2, 229.26, 231.71, 314, 231.81, 451, 229.13, 146, 229.16; 224/526, 270, 148.1; 52/27

(56) References Cited

U.S. PATENT DOCUMENTS

| | | | |
|---|---|---|---|
| 236,457 | 1/1881 | Reimer | 434/415 |
| 369,663 | 9/1887 | Swaney | 210/483 |
| 2,158,368 | 5/1939 | Hurt | 434/251 |
| 2,300,248 | 10/1942 | Elnett | 434/417 |
| 2,319,278 | 5/1943 | Urbain | 434/421 |
| 2,651,852 | 9/1953 | Urbain | 434/417 |
| 3,008,249 | 11/1961 | Masters | 434/421 |
| 3,363,341 | 1/1968 | Glassman | 434/417 |
| 4,133,123 | 1/1979 | Anderson | 40/1 |
| 4,428,135 | 1/1984 | Sobel | 40/155 |

*Primary Examiner*—Deborah Jones
*Assistant Examiner*—Abraham Bahta
(74) *Attorney, Agent, or Firm*—Pennie & Edmonds LLP

(57) ABSTRACT

A message board comprising a bulletin board fixedly mounted on a backing of heavy cardboard or other substrate, and an optional dry-erase laminate fixedly mounted onto the bulletin board. A frame is fixedly secured to the edges of the bulletin board and backing. The frame is provided with a front channel and a rear channel, each adapted to receive and firmly retain a portion of a generally "C"-shaped grip. The grip may be integrally formed with various accessories desired to be attached to the frame of the message board or other similarly shaped fixed member.

22 Claims, 12 Drawing Sheets

BULLETIN BOARD ACCESSORIES AND ACCESSORY ATTACHING MECHANISM

REFERENCE TO RELATED APPLICATIONS

This application is a continuation of U.S. application Ser. No. 08/877,280, filed on Jun. 17, 1997 U.S. Pat. No 5,976, 663, which is a continuation-in-part of U.S. patent application Ser. No. 08/526,707, filed Sep. 11, 1995, now U.S. Pat. No. 5,658,635. The priority of these prior applications is expressly claimed and their disclosure is hereby incorporated by reference in their entirety.

FIELD OF THE INVENTION

This invention relates to the field of message boards, and more particularly relates to accessories attachable to message boards and mechanisms for attaching such accessories to message boards.

BACKGROUND OF THE INVENTION

Various forms of message boards are known in the art. The conventional bulletin board, which is generally made from a cork or other tack penetrable material, has been used to pin or tack notes or other things to it. Other message boards include dry-erase boards which are essentially smaller versions of the big dry-erase boards used like blackboards (or more accurately "white" boards) in offices and elsewhere. A combination bulletin and dry-erase message board is the subject of Applicant's U.S. Pat. No. 5,527,568.

In addition to the various materials used to comprise the surfaces of these message boards, it has also been known to attach various accessories to the surfaces and edges of the message boards. Trays, storage receptacles, and various types of holders are typical of these types of accessories. These accessories are typically attached to the frames and surfaces of the message boards by adhesive bonding, nailing, screwing, and similar techniques, or, alternatively, by detachably securing the accessory to the frame. Many of these arrangements are relatively complicated or cumbersome to use, and many do not provide a firm attachment such that the accessory is held firmly to the frame of the message board by a positively locking mechanism. There are also only a limited number of types of accessories available in the prior art which are capable of providing only a limited number of functions.

SUMMARY OF THE INVENTION

It is accordingly a principal object of the present invention to provide an improved message board having a frame adapted to receive and firmly retain various accessories in a convenient manner.

In a second aspect, a grip comprises a generally "C"-shaped body having a tip at one end and a lip extension at the other end. The tip is adapted to engage the front channel of the frame, while the lip extension is adapted to engage the rear channel of the frame, to thereby retain the grip on the frame. Various accessories designed to be attached to the frame are formed integrally with the grip.

In a number of additional aspects, several accessories of various designs and capable of performing various functions are provided.

Further objects and advantages of the present invention will become apparent from a consideration of the drawings and ensuing description.

DETAILED DESCRIPTION OF THE PREFERRED EMBODIMENT

Turning now to the drawings, a message board 10 according to the present invention comprises a square or rectangular bulletin board 12 occupying the central portion of the board. The bulletin board 12 may comprise a cork board, synthetic cork board, tile board, or fiber board, any of which may be covered by a coarse fabric if desired. A dry-erase surface or laminate (not shown) may be used in addition to, or instead of, the bulletin board 12. The dry-erase surface preferably comprises porcelain coated paper, masonite or metal. The dry-erase surface can be used for writing notes and messages, just like a conventional dry-erase board, whereas the bulletin board 12 can have notes or other things pinned to it. The front surface of the message board 10 may comprise a bulletin board 12 alone, a dry-erase surface alone, or a combination of a portion comprising a bulletin board 12 and a portion comprising a dry-erase surface.

Figure 2:
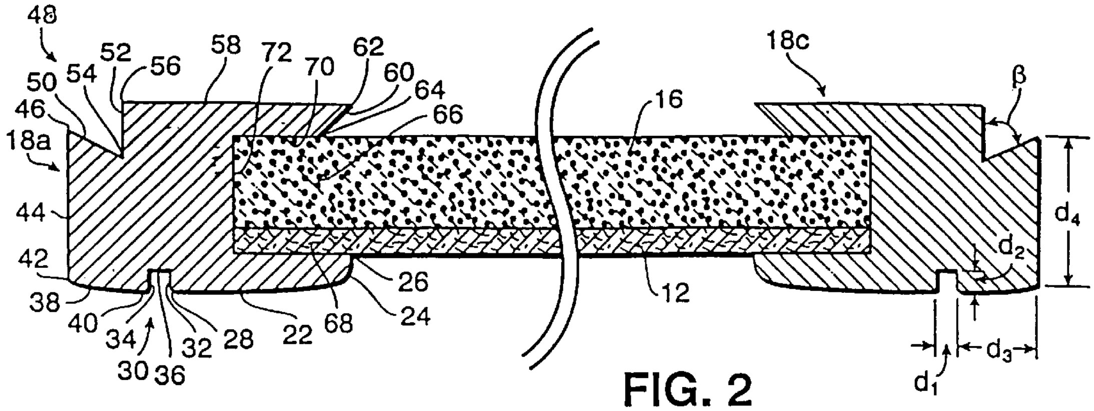
FIG. 2 is a cross-sectional view of the message board of FIG. 1, taken along the line 2—2 in FIG. 1.

Referring to FIG. 2, the above embodiment is preferably constructed by fixedly mounting the bulletin board 12 onto a heavy cardboard backing 16, or some other substrate or backing material. The dry-erase surface is, in turn, fixedly mounted onto the bulletin board 12 if desired. For convenience, the embodiment described below will comprise a bulletin board 12 alone, with no dry-erase surface.

Figure 1:
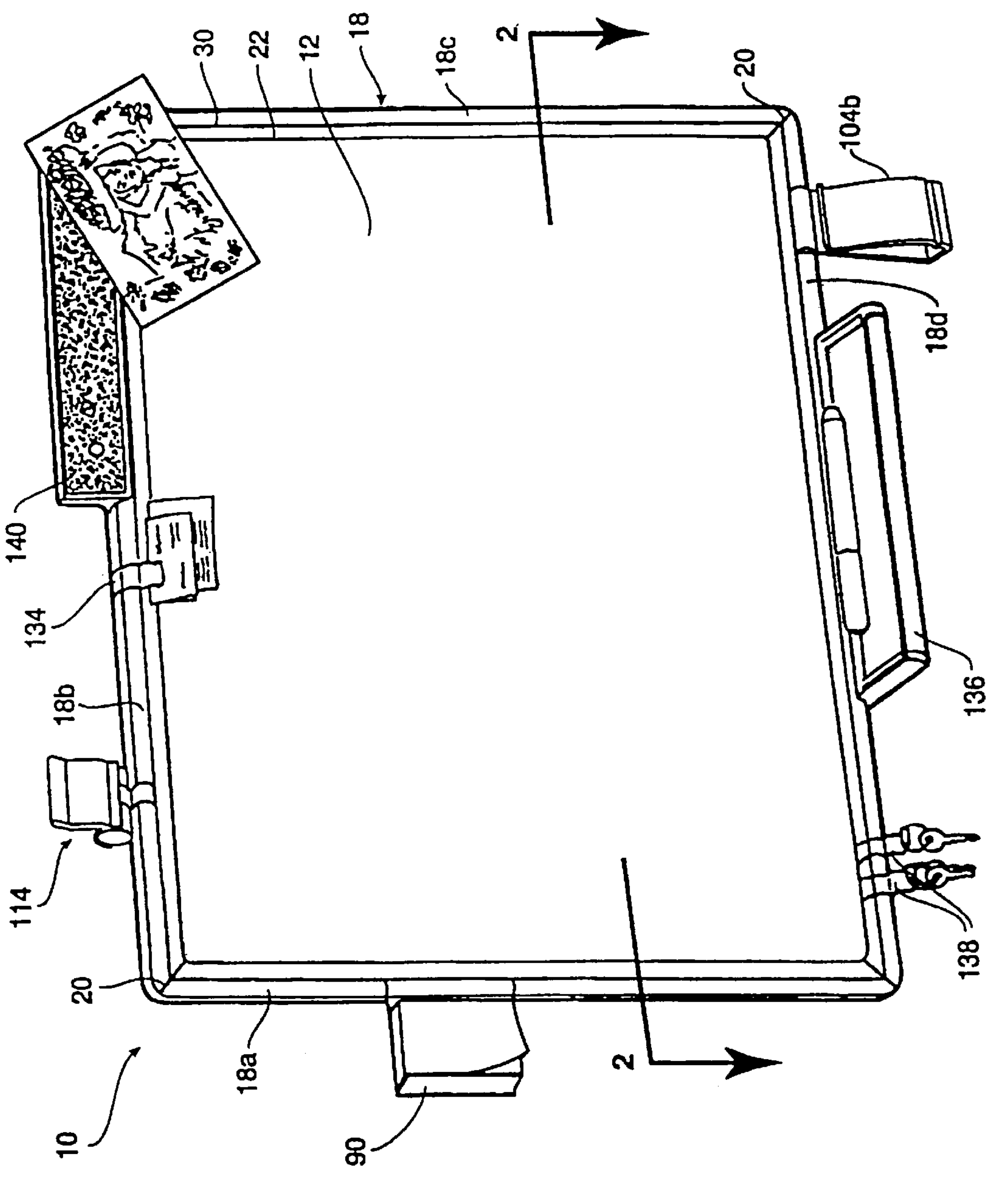
FIG. 1 is a perspective view of a message board in accordance with a preferred form of the present invention.

Referring now to FIG. 1, a frame 18 extends completely around the periphery of the bulletin board 12. The frame 18 comprises four separate frame sections **18*a*, 18*b*, 18*c* and 18*d*, one frame section secured to each side of the square or rectangular bulletin board 12. Each frame section 18*a*–18*d* is mitered at both ends, in a manner well known in the art, to form a corner 20 with each adjacent section when the frame 18 is assembled. The frame 18 preferably comprises wood, but may also be constructed of injection molded plastic, extruded aluminum, or other suitable material. Further, the frame 18** may be provided with separate corner sections rather than having the mitered corners shown in the Figures.

Turning now to FIG. 2, a cross-section of two sections **18*a* and 18*c* of the frame 18 are illustrated such that the details of the frame sections 18*a* and 18*c* can be described, it being understood that the other frame sections 18*b* and 18*d* are of like construction. For convenience, the surfaces of the frame sections 18*a* and 18*c* will be described in two dimensions relative to horizontal planes and vertical planes. Horizontal planes are here defined as the plane within which lies the bulletin board 12** and all planes parallel to that plane, while vertical planes are all planes perpendicular to the horizontal planes.

The frame section **18*a* comprises a solid member defining a number of surfaces, the surfaces further defining three channels: a front channel 30, a rear channel 48, and an internal channel 66. The front channel 30 and rear channel 48 of the frame section 18*a* provide the frame 18 with the capability to receive and retain a grip that is associated with an accessory, thus providing the capability of snapping accessories onto the frame 18, as more fully described below. The internal channel 66 is adapted to receive and retain the bulletin board 12 and backing 16 to thereby connect the frame 18 to the bulletin board 12**.

As shown in FIG. 2, the frame section **18*a* comprises a front inside surface 22 that extends in a horizontal plane over most of its length. The front inside surface 22 has an upward curving portion 24 that curves upward, or toward the front surface of the bulletin board 12, and that terminates at a corner 26 shared with an internal channel front side surface 68. At the end of the front inside surface 22 opposite the upward curving portion 24, the front inside surface 22 terminates at a corner 28 shared with a front channel inside surface 32 of the front channel 30**.

The front channel 30 is defined by a pair of front channel side surfaces 32 and 34 and a front channel bottom surface 36. The front channel side surfaces 32 and 34 lie in parallel vertical planes and are separated by a distance di, which in the preferred embodiment is 0.069", while the front channel bottom surface 36 lies in a horizontal plane a distance $d_2$, which in the preferred embodiment is 0.078", above the corner 40 shared between the front outside surface 38 and the outer of the front channel side surfaces 34. The front channel side surface 32 adjacent the front inside surface 22 is slightly longer than the front channel side surface 34 adjacent the front outside surface 38, i.e., the front channel side surface 32 has a length greater than $d_2$, with the result that the corner 28 shared between the front inside surface 22 and the front channel side surface 32 lies in a horizontal plane slightly below the horizontal plane in which lies the corner 40 shared between the front outside surface 38 and the front channel side surface 34. In other words, the corners 28 and 40 are slightly offset, with the corner 40 being slightly above the corner 28. The corners formed by the two front channel side surfaces 32 and 34 with the front channel bottom surface 36 are preferably slightly rounded, but may be square.

The frame section **18*a* further comprises a front outside surface 38 and an end surface 44. The front outside surface 38 extends from a corner 40 shared with the outer of the front channel side surfaces 34 to a corner 42 shared with the end surface 44 of the frame section 18*a*, and has an overall length of $d_3$. In the preferred embodiment, $d_3$ is 0.294". The front outside surface 38 does not lie in a horizontal plane, but is slightly upwardly curved, as shown in FIG. 2. The slight upward curve of the front outside surface 38 is to facilitate attachment and detachment of accessories, as more fully described below. The corner 42 formed by the front outside surface 38 and the end surface 44 is slightly rounded. The end surface 44 is substantially planar, lying in a vertical plane, and having a length $d_4$. In the preferred embodiment, $d_4$ is 0.512". The end surface 44 extends from the rounded corner 42 shared with the front outside surface 38 to a rounded corner 46 shared with the rear channel 48**.

The rear channel 48 is defined by a first rear channel side surface 50, a second rear channel side surface 52, a rear channel corner 54, the corner 46 shared with the end surface 44, and a corner 56 shared with the rear surface 58. The first rear channel side surface 50 is declined an angle $\beta$ from the vertical and extends from the rounded corner shared with the end surface 46 to the rear channel corner 54 that joins the first rear channel surface 50 with the second rear channel side surface 52. The second rear channel side surface 52 lies in a vertical plane, and extends from the rear channel corner 54 to the rounded corner 56 shared with the rear surface 58. Because the first rear channel side surface 50 is inclined by an angle $\beta$ from the vertical, and the second rear channel side surface 52 is vertical, the first rear channel side surface 50 and second rear channel side surface 52 together define an acute angle $\beta$. Angle $\beta$ is preferably about 59°.

The frame section **18*a* further comprises a rear surface 58 and a back edge 60. The rear surface 58 is generally planar, lying in a horizontal plane and extending from the corner 56 shared with the second rear channel side surface 52 to a corner 62 shared with the back edge 60. The back edge 60 is also generally planar, lying in a plane that is inclined by an angle $\epsilon$ from the horizontal plane. The back edge 60 extends from the corner 62 shared with the rear surface 58 to a corner 64 shared with one of the side surfaces of the internal channel 66**.

The internal channel 66 is defined by a pair of internal channel side surfaces 68 and 70 and an internal channel bottom surface 72. The internal channel side surfaces 68 and 70 lie in parallel horizontal planes, while the internal channel bottom surface 72 lies in a vertical plane outside the corner 64 shared by the back edge 60 with the internal channel back side surface 70. The corners formed by the two internal channel side surfaces 68 and 70 with the internal channel bottom surface 72 are preferably square, but may be slightly rounded.

The relative orientations of the surfaces and channels of the frame section 18*a*, in combination with the shapes of the grip, provide the capability of detachably snapping various accessories to the frame 18. Further, the front channel 30 and rear channel 48 of the frame 18 extend over the entire frame 18, thereby providing the capability of snapping accessories on any of the sides of the frame 18, such as the left, right, top and bottom sides. For example, in FIG. 1 there is illustrated a number of accessories attached to the frame 18 of the message board 10, including a Mail Holder 104, a Notepad Holder 90, an Eraser and Holder 114, a Note Grip 134, a Tray 136, a pair of Key Holders 138, and a Pin-up Strip 140. Each of these accessories is provided with a grip adapted to snap onto the frame 18 via an interface with the front channel 30 and rear channel 44 of the frame 18, as more fully described below.

Figure 3:
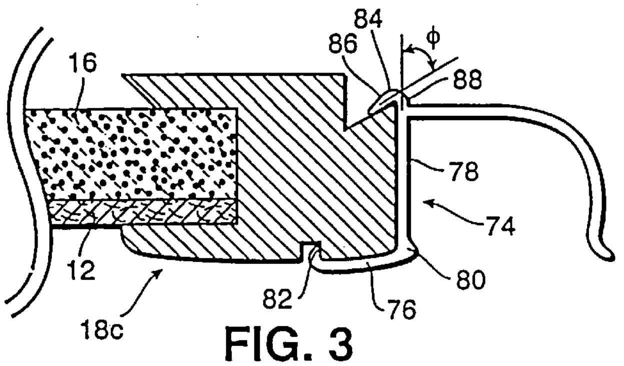
FIG. 3 is a cross-sectional view of a grip and a frame section of the message board of FIG. 1.

Turning to FIG. 3, there is shown a cross-sectional view of a grip 74 adapted to snap onto a frame section, e.g., 18*c*, of the frame 18. The grip 74 comprises a slightly curved front extension 76, a generally flat end extension 78, and a curved connecting portion 80 connecting the front extension 76 to the end extension 78. The front extension 76 has a length approximately equal to that of the front outside surface 38 of the frame section 18*c*, while the end extension 78 has a length approximately equal to that of the end surface 44 of the frame section 18*c*. The curved connecting portion 80 has a curved shape approximating that of the rounded corner 42 connecting the front outside surface 38 to the end surface 44 of the frame section 18*c*.

The grip 74 further comprises a tip 82 at an end of the front extension 76 opposite the connecting portion 80. The tip 82 comprises a short extension that juts a short distance out from the front extension 76 in a direction generally perpendicular to the portion of the front extension 76 to which the tip 82 is attached. The tip 82 is adapted to engage the front channel 30 of the frame section 18*c*, and therefore necessarily has a width roughly equal to, but not larger than, the distance $d_1$, and a length roughly equal to the distance $d_2$.

The grip 74 further comprises a curled lip 84 at an end of the end extension 78 opposite the connecting portion 80. The curled lip 84 comprises a lip extension 86 connected to the end extension 78 by a rounded corner 88. The lip extension 86 forms an angle $\phi$ with the end extension 78. The lip extension 86 is adapted to engage the rear channel 48 of the frame section 18*a*, and therefore necessarily has a length roughly equal to the length of the first rear channel side surface 50. Similarly, the angle $\phi$ formed between the lip extension 86 and the end extension 78 is necessarily approximately equal to $\beta$, where $\beta$ is the angle defined by the first rear channel side surface 50 and the second rear channel side surface 52. Accordingly, the angle $\phi$ is about 59°.

The grip 74 thus forms a generally "C"-shaped member, with the tip 82 at one end of the "C" and the lip extension 86 at the other end of the "C". The grip 74, and the accessories, are preferably made of plastic, but could also be made of another flexible, resilient material.

As shown in FIG. 3, the relative orientations of the grip 74 and the frame 18 provide the grip 74 with the capability of snapping onto, and unsnapping from, the frame 18. More particularly, the lip extension 86 of the grip 74 is adapted to be received and retained in, or snap into, the rear channel 48 of the frame 18, while at the same time the tip 82 of the front extension 76 of the grip 74 is adapted to be received and retained in, or snap into, the front channel 30 of the frame 18. This is accomplished by first inserting the lip extension 86 of the grip 74 into the rear channel 48 of the frame section 18*a*. At this point, due to the length of the end surface 44 of the frame section 18*a* relative to the distance between the curled lip 84 and the tip 82 of the front extension 76 of the grip 74, the tip 82 of the front extension 76 of the grip 74 is unable to be lifted over the front outside surface 38 and placed in the front channel 30 without first causing the lip extension 86 to bend outward, i.e., increasing the angle $\phi$ between the lip extension 84 and the end extension 78 to greater than 59°. The bending outward of the lip extension 86 provides the capability of lifting the tip 82 of the front extension 76 over the front outside surface 38 of the frame section 18*a* and placing the tip 82 of the front extension 76 of the grip 74 into the front channel 30. Upon lifting the tip 82 of the front extension 76 over the front outside surface 38 of the frame section 18*a* and encountering the front channel 30, the tip 82 of the front extension 76 of the grip 74 "snaps" into the front channel 30 due to the force created in the grip 74 by the bending of the lip extension 86. The resilient forces of the tip 82 of the front extension 76 of the grip 74 and the lip extension 86 thereby hold the grip 74 in place on the frame section 18*a*.

When the grip 74 is snapped onto the frame section 18*a* as discussed above, the front extension 76 generally rests against the front outside surface 38 of the frame 18. Similarly, the end extension 78 of the grip 74 generally rests against the end surface 44 of the frame 18. To detach the grip 74, an outwardly directed force may be applied to the end extension 78 to displace the lip extension 82 from the rear channel 48, allowing easy removal of the tip 82 of the front extension 76 from the front channel 30. Alternatively, an outwardly directed force may be applied to the front extension 76 to displace the tip 82 from the front channel 30, allowing easy removal of the lip extension 86 from the rear channel 48.

Figure 7:
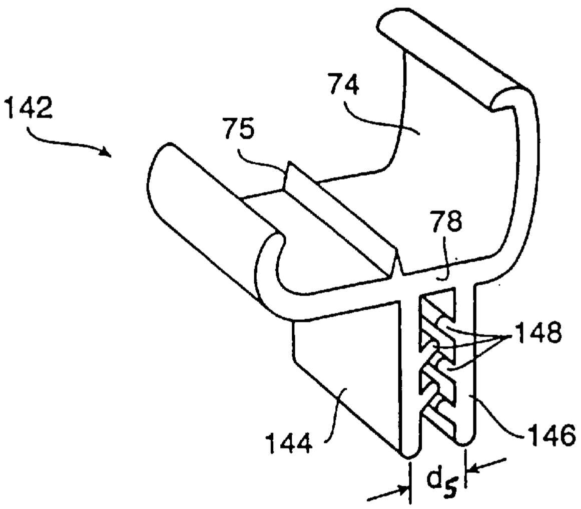
FIG. 7 is a perspective view of a Photo Grip in accordance with a preferred form of the present invention.

Turning briefly to FIG. 7, a grip 74 may advantageously be provided with a spike-shaped slide stop 75 on the internal surface of the end extension 78 of the grip. The slide stop 75 is preferably made of an elastomeric material to provide flexibility and resiliency. When the grip 74 is attached to a frame or other fixed member, the slide stop 75 is interposed between the body of the grip 74 and the frame to provide a friction force preventing the grip 74 from sliding relative to the frame. A slide stop 75 may be provided on any grip 74 of any accessory described herein.

As discussed above, any number of accessories can be provided with a grip 74 as described above to provide the capability of snapping the accessory onto a frame 18 of a message board 10 or other similarly shaped fixed member. An accessory is a device to be attached to the frame 18 of the message board 10 or other fixed member to perform a desired function, and that is preferably integrally formed with, or otherwise attached to, a grip 74 of the type shown and described herein. Accordingly, an accessory may be formed from any number of materials, such as extruded plastic, metals such as aluminum, wood, or other alternatives known in the art.

Figure 4A:
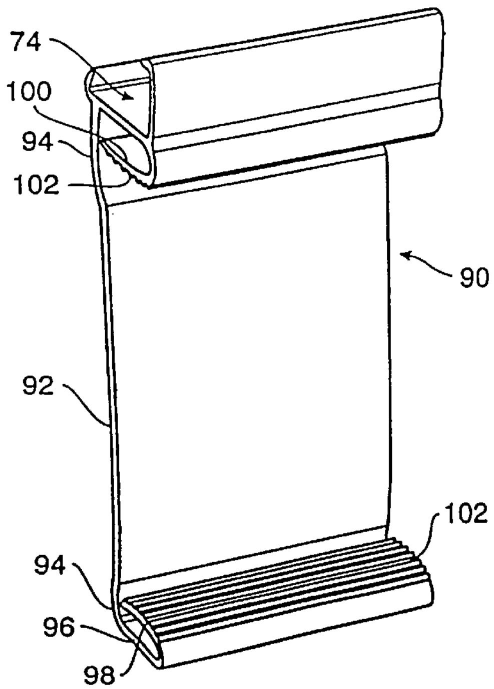
FIG. 4A is a perspective view of a Notepad Holder in accordance with a preferred form of the present invention.
Figure 4B:
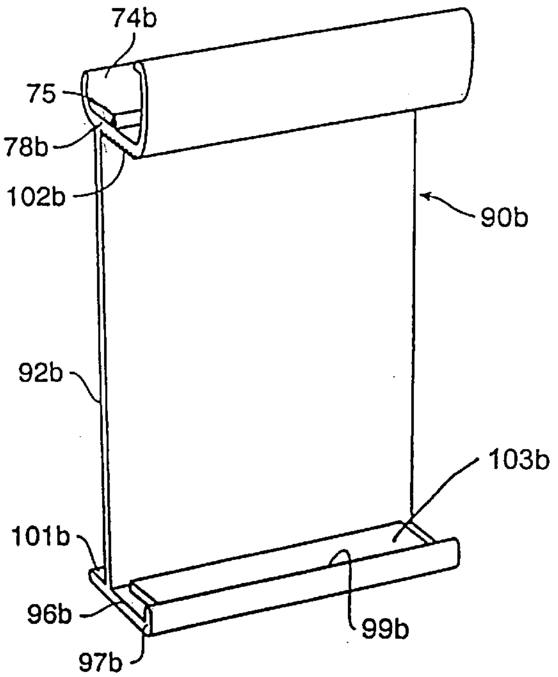
FIG. 4B is a perspective view of a Notepad Holder in accordance with another preferred form of the present invention.
Figure 5A:
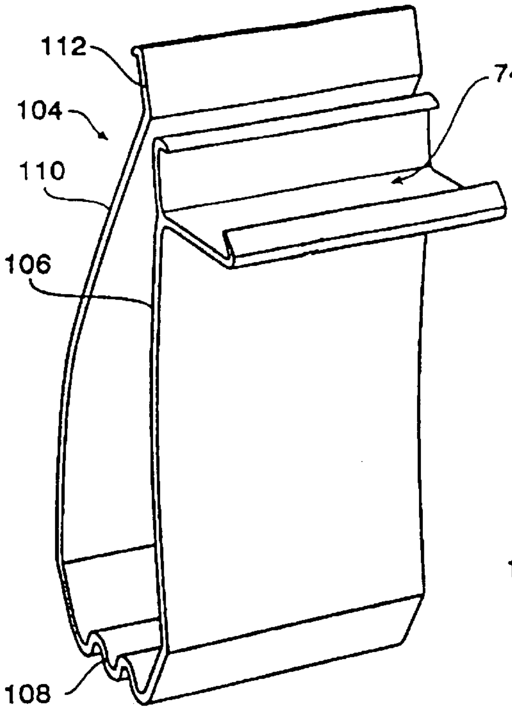
FIG. 5A is a perspective view of a Mail Holder in accordance with a preferred form of the present invention.
Figure 5B:
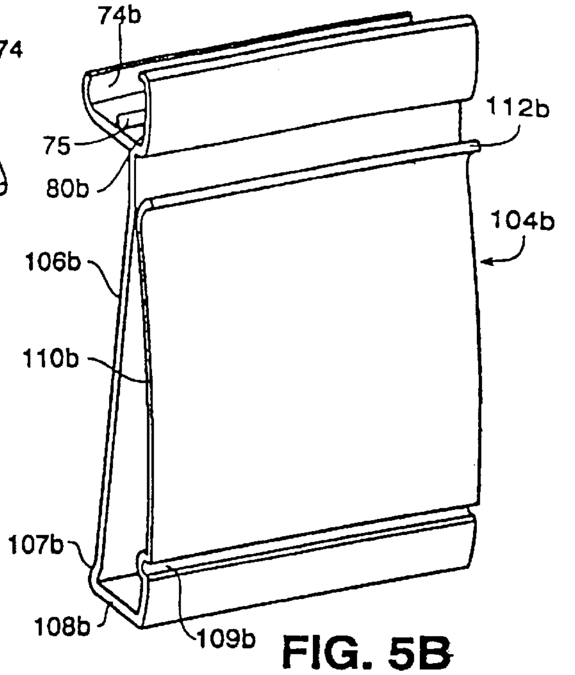
FIG. 5B is a perspective view of a Mail Holder in accordance with another preferred form of the present invention.

For example, in FIGS. 4A and 4B, there are shown two preferred forms of Notepad Holders 90 and 90*b*, in FIGS. 5A and 5B there are shown two preferred forms of Mail Holders

Figure 6A:
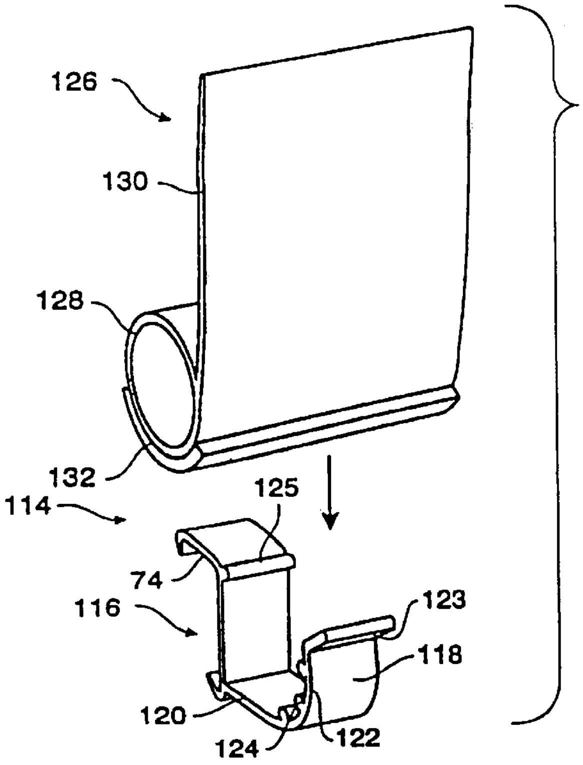
FIG. 6A is a perspective view of an Eraser and Holder in accordance with a preferred form of the present invention.
Figure 6B:
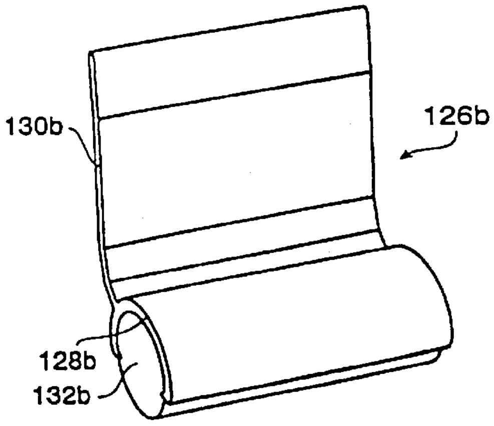
FIG. 6B is a perspective view of an Eraser in accordance with another preferred form of the present invention.

104 and 104*b*, and in FIGS. 6A and 6B there are shown two preferred forms of Erasers 126 and 126*b* and an Eraser Holder 116, each adapted for use with the message board 10. Additional examples are shown in FIGS. 7–18, where the following accessories are shown: a Photo Grip 142 (FIG. 7), a Mini Dry Erase Board 152 (FIG. 8), a Coupon Clip 162 (FIG. 9), a Message Notification Unit 178 (FIG. 10), a Clip-on Calculator 190 (FIGS. 11A–D), a Tray 208 (FIGS. 12A–B), a Diskette/Card Holder 224 (FIG. 13), a Pen Cup 238 (FIG. 14), a Pen Holder 254 (FIG. 15), a Multi-Purpose Hook 268 and Calendar 274 (FIGS. 16A–B), a Cup Holder 280 (FIG. 17), and a Fabric Clip 292 and Pouch 300 (FIGS. 18A–B). Each of these accessories is more fully described below, it being understood that many other types of accessories are possible, such as those described above with respect to FIG. 1.

Turning now to FIG. 4A, the Notepad Holder 90 comprises a grip 74, substantially as described above. The Notepad Holder further comprises a generally flat surface 92 that extends substantially perpendicularly from the back surface of the end extension 78 of the grip 74 and that is integrally formed with the grip 74. The flat surface 92 is attached to the end extension 78 at a point nearer to the curled lip 84 than to the connecting portion 80. The flat surface 92 has a slightly curved portion 94 at each of its ends, the first of which comprises the portion of the flat surface 92 that is attached to the grip 74. At the end of the flat surface 92 opposite the grip 74, there is a horseshoe-shaped upward extension 96 that is approximately perpendicular to the flat surface 92. The upward extension 96 extends perpendicular to the flat surface 92, then sharply curves 180° into a downward extending portion 98 that extends back downward toward the flat surface 92, thereby defining a horseshoe shape. The downward extending portion 98 of the upward extension 96 extends downward toward the flat surface 92, but does not re-connect to the flat surface 92. The Notepad Holder 90 further comprises a flap 100 that extends from the back surface of the grip 74, connecting to the grip 74 approximately at the connecting portion 80. The flap 100 extends initially outward away from the grip 74 and then curves sharply downward toward the flat surface 92. The flap 100 and the downward extending portion 98 of the upward extension 96 thereby form a pair of oppositely opposed surfaces. The exterior facing surfaces of the flap 100 and the downward extending portion 98 of the upward extension 96 are further provided with a plurality of raised beads 102.

The Notepad Holder 90 thus described provides the capability of receiving and retaining an appropriately sized notepad, or alternatively, a stack of Post-It® Notes. The notepad or Post-It® Notes conveniently fit between the downward extending portion 98 of the upward extension 96 and the flap 100, each of which is capable of flexing by a slight amount to accommodate the notepad or Post-It® Notes. The raised beads 102 on and along the surfaces of the upward extension 96 and the flap 100 also aid in retaining the notepad or Post-It® Notes in the Notepad Holder 90.

A second preferred embodiment of the Notepad Holder 90*b* is shown in FIG. 4B. In this embodiment, the Notepad Holder comprises a grip 74*b*, substantially as described above, but having a generally spike-shaped slide stop 75 formed integrally with the grip on the internal surface of the end extension 78*b* of the grip 74*b*, as described elsewhere. The Notepad Holder 90*b* further comprises a generally flat surface 92*b* that extends substantially perpendicularly from the back surface of the end extension 78*b* of the grip 74*b* and that is integrally formed with the grip 74*b*. The flat surface 92*b* is attached to the end extension 78*b* at a point nearer to the curled lip 84*b* than to the connecting portion 80*b*. At the end of the flat surface 92*b* opposite the grip 74*b*, there is a flat upward extension 96*b* that is substantially perpendicular to the flat surface 92*b*. The upward extension 96*b* extends perpendicular to the flat surface 92*b*, then curves 90° to form a short projection 97*b*. Accordingly, the short projection 97*b*, the upward extension 96*b*, and the flat surface 92*b* form a shallow channel 99*b* at one end of the Notepad Holder. A generally rectangular foam insert 103*b* is provided and is retained in the shallow channel 99*b* by friction fit, adhesive, or the like. A short downward extension 101*b* extends substantially perpendicular from the back of the flat surface 92*b* at the end opposite the grip 74*b*. The Notepad Holder further comprises a plurality of raised beads 102*b* on the external facing surface of the end extension 78*b* of the grip 74*b*.

The Notepad Holder 90*b* thus described provides the capability of receiving and retaining an appropriately sized notepad, or alternatively, a stack of Post-It® Notes. The notepad or Post-It® Notes conveniently fit up against the foam insert 103*b* in the shallow channel 99*b* on one side and the external surface of the end extension 78*b* of the grip 74*b* on the other side. The foam insert 103*b* is preferably sufficiently springy to flex by a slight amount to accommodate the notepad or Post-It® Notes. The raised beads 102*b* on and along the external surface of the end extension 78*b* of the grip 74*b* further aids in retaining the notepad or Post-It® Notes in the Notepad Holder 90*b*.

Turning now to FIG. 5A, the Mail Holder 104 comprises a grip 74, substantially as described above. The Mail Holder 104 further comprises a flat surface 106 that is formed integrally with the grip 74 and that extends outward from the back surface of the grip 74. The flat surface 106 is attached to the grip 74 near the connecting portion 80, and is approximately perpendicular to the end extension 78. At the end of the flat surface 106 opposite the grip 74, there is provided a “W”-shaped base portion 108 of the Mail Holder 104. The base portion 108 is provided with a plurality of raised portions or waves 109, thus giving the base portion 108 a “W”-shape. In the embodiment shown in FIG. 5, there are two waves 109, it being understood that more or fewer waves 109 are possible. A gradually curving clip portion 110 is provided at the side of the base 108 opposite the flat surface 106. The clip portion 110 extends outward from the base 108 and gradually curves back toward the flat surface 106, terminating in an outwardly turned lip 112. The outwardly turned lip 112 abuts the front surface of the flat surface 106 near the point at which the flat surface 106 is attached to the grip 74.

The flat surface 106, the “W”-shaped base 108 and the gradually curving clip portion 110 of the Mail Holder 104 define a space adapted to receive and retain envelopes, pieces of paper, or other similarly shaped objects when the Mail Holder 104 is clipped to the bottom frame section 18*d* of the message board 10. The clip portion 110 and flat surface 106 combine to provide a slight clamping force to hold these items in place in the Mail Holder 104.

A second preferred embodiment of the Mail Holder 104*b* is shown in FIG. 5B. In this embodiment, the Mail Holder comprises a grip 74*b*, substantially as described above, but having a generally spike-shaped slide stop 75 formed integrally with the grip on the internal surface of the end extension 78*b* of the grip 74*b*, as described elsewhere. The Mail Holder 104*b* further comprises a rear surface 106*b* that is formed integrally with the grip 74*b* and that extends outward from the back surface of the grip 74*b*. The rear surface 106*b* is attached to the grip 74*b* near the connecting portion 80*b*, and is approximately perpendicular to the end extension 78*b* over a portion of the rear surface 106*b* near this attachment point. The rear surface 106*b* then curves slightly rearward to define an open space between the rear surface 106*b* and a clip portion 110*b* discussed further below.

At the end of the rear surface 106*b* opposite the grip 74*b*, there is provided a base portion 108*b* that is adapted to receive and retain a grip 74 on its external surfaces. The base portion 108*b* includes a rearwardly extending corner 107*b* on its rear side and a "C"-shaped groove 109*b* on its front side. The rearwardly extending corner 107*b* is adapted to engage the lip 84 of a grip 74 and the "C"-shaped groove 109*b* is adapted to engage the tip 82 of a grip 74 in a manner similar to that described elsewhere in which a grip 74 is retained on a frame member. In this way, a Mail Holder 104*b* is capable of being clipped onto the base 108*b* of another Mail Holder 104*b* to create a "chain" of Mail Holders 104*b* attached to a frame or other member.

A gradually curving clip portion 110*b* is provided at the side of the base 108*b* opposite the rear surface 106*b*. The clip portion 110*b* extends upward from the base 108*b* and gradually curves back toward the rear surface 106*b*, terminating in an outwardly turned lip 112*b*. The outwardly turned lip 112*b* abuts the front surface of the rear surface 106*b* near the point at which the rear surface 106*b* is attached to the grip 74*b*. The rear surface 106*b*, the base 108*b* and the gradually curving clip potion 110*b* of the Mail Holder 104*b* define a space adapted to receive and retain envelopes, pieces of paper, or other similarly shaped objects. The clip portion 110*b* and rear surface 106*b* combine to provide a slight clamping force to hold these items in place in the Mail Holder 104*b*.

Turning now to FIG. 6A, an Eraser and Holder 114 comprise two parts, an Eraser 126 and an Eraser Holder 116. The Eraser Holder 116 comprises a grip 74, substantially as described above. The Eraser Holder further comprises a curved extension 118 that is integrally formed with the grip 74 and that extends outwardly from the back surface of the grip 74. The curved extension 118 is attached to the back surface of the grip 74 at a point near the rounded corner 88 connecting the end extension 78 with the lip extension 86. The curved extension 118 has a first portion 120 that extends initially outward from the back surface of the grip 74 in a direction perpendicular to the end extension 78 of the grip 74, then gradually curves to form a second portion 122 that is approximately perpendicular to the first portion 120. The curved extension 118 terminates in an outwardly turned lip 123 at the end of the second portion 122. The curved extension 118 is further provided with a plurality of raised beads 124 disposed on and along the inside surface of the curved extension 118.

The Eraser Holder 116 further comprises a retaining bump 125 that is formed on the back surface of the connecting portion 80 of the grip 74. The Eraser Holder 116 thereby forms a generally "U"-shaped member adapted to receive the Eraser 126, as described below. The raised beads 124 provide an additional gripping force for the Eraser Holder 116 to grip the Eraser 126. The grip 74 of the Eraser Holder 116 provides the capability of snapping the Eraser Holder 116 onto a frame section, e.g., 18*b*, of the frame 18.

The Eraser 126 comprises a cylinder 128 having a tangentially extending flat surface 130, to thereby form a "b"-shaped member. The cylinder 128 is provided with a covering 132 of felt, cloth, or other substance suitable for erasing materials written on a dry-erase board. The felt covering 132 extends over approximately one-third of the external surface of the cylinder 128. Alternatively, as shown in FIG. 6B, an Eraser 126*b* may comprise a half-cylinder 128*b* having a tangentially extending flat surface 130*b*. A cylindrical insert 132*b* is inserted into the half-cylinder 128*b* and is retained by friction fit or by an adhesive. The cylindrical insert 132*b* preferably comprises a foam material suitable for erasing dry erase surfaces.

As shown in FIG. 1, the Eraser Holder 116 is adapted to receive and retain the Eraser 126 while the Eraser Holder 116 is snapped onto the frame 18 of the message board 10. The "U"-shaped curved extension 118 is adapted to receive the Eraser 126, while the curved extension 118, the raised beads 124, and the raised bump 125 cooperate to provide a slight clamping force to retain the Eraser 126 in the Eraser Holder 116.

Turning now to FIG. 7, a Photo Grip 142 comprises a grip 74 having a spike-shaped slide stop 75, substantially as described above. The Photo Grip further comprises a first extension 144 and second extension 146 that each extend substantially perpendicularly from the back surface of the end extension 78 of the grip 74 and that are each integrally formed with the grip 74. The first extension 144 and second extension 146 are parallel to each other, separated a distance $d_5$ from each other, and are both attached to the end extension 78 at a point nearer to the connecting portion 80 than to the curled lip 84. The first extension 144 and second extension 146 are typically the same length, though different lengths are possible.

A plurality of flexible fingers 148 are formed integrally with or attached to the facing surfaces of the first extension 144 and second extension 146. Each finger 148 is generally spike shaped and is oriented such that it faces generally outwardly and downwardly, i.e., toward both the opposite extension surface and the body of the grip 74. Each finger 148 typically has a length of slightly more than ½ of the distance $d_5$ separating the first extension 144 and second extension 146. The fingers 148 are preferably made of an elastomeric material for flexibility and resiliency.

The Photo Grip 142 thus described provides the capability of receiving a photo (not shown) between the first extension 144 and second extension 146. Once inserted between the first extension 144 and second extension 146, the flexible fingers 148 gently "bite" into the front and rear surfaces of the photo to thereby hold it in place. The retaining force provided by the flexible fingers 148 is sufficient to retain the photo in place without harming its surface, yet not so strong that the photo cannot be fairly easily removed without damage. Other similarly shaped objects such as cards, notes, coupons, or the like can also be retained by the Photo Grip 142 in a similar manner.

Figure 8:
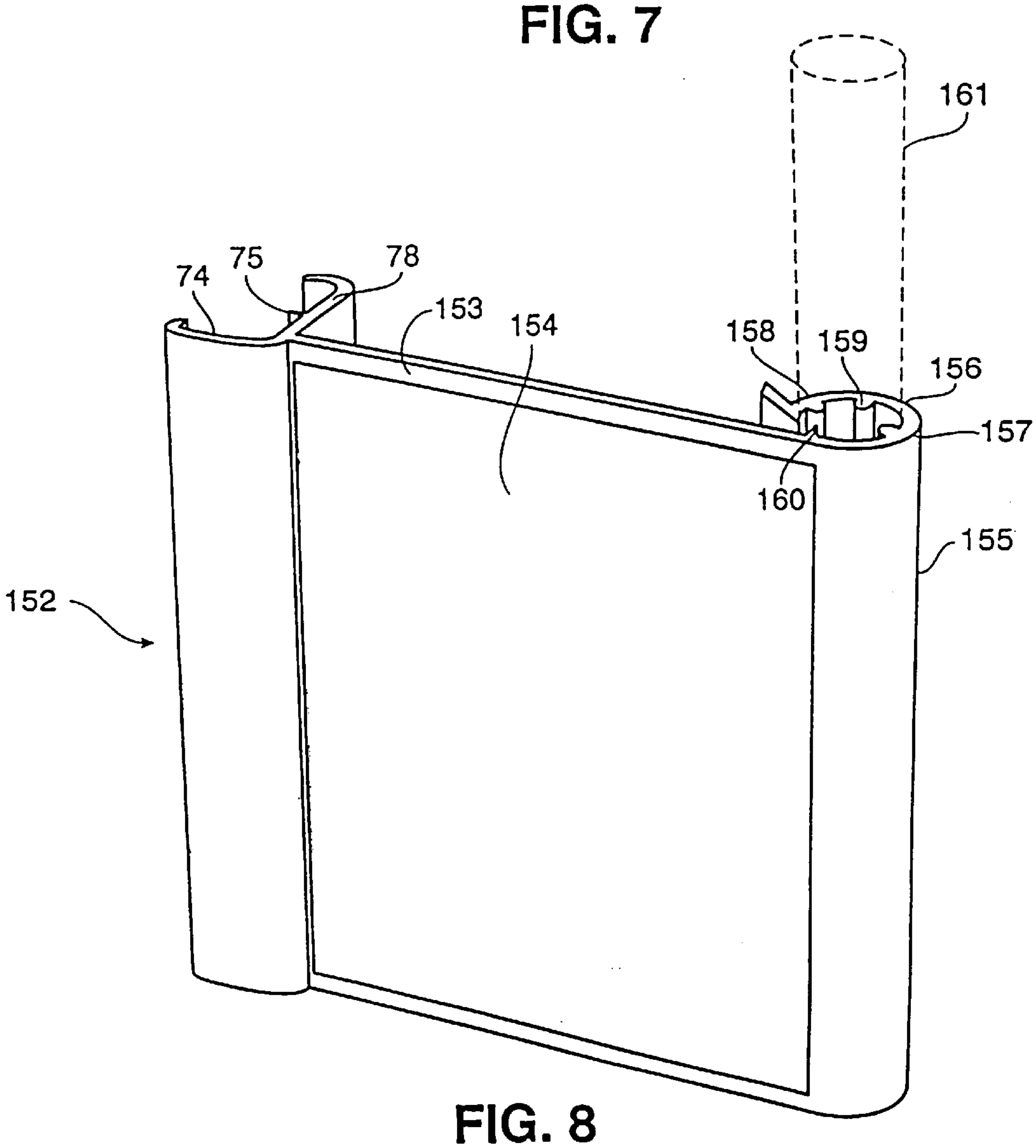
FIG. 8 is a perspective view of a Mini Dry Erase Board in accordance with a preferred form of the present invention.

Turning now to FIG. 8, a Mini Dry Erase Board 152 comprises a grip 74 having a spike-shaped slide stop 75, substantially as described above. The Mini Dry Erase Board further comprises a body portion 153 that extends substantially perpendicularly from the back surface of the end extension 78 of the grip 74 and that is integrally formed with the grip 74. The body portion 153 of the Mini Dry Erase Board 152 is attached to the end extension 78 at a point nearer to the connecting portion 80 than to the curled lip 84.

On the forward-facing surface of the body portion 153 of the Mini Dry Erase Board is a dry erase surface 154. The dimensions of the dry erase surface 154 can be varied, depending on the size of the body portion 153 of the Mini Dry Erase Board. The dry erase surface 154 is preferably a laminate material, such as porcelain coated paper, masonite or metal, that is suitable for use with a dry erase pen in a manner well known in the art.

Figure 9:
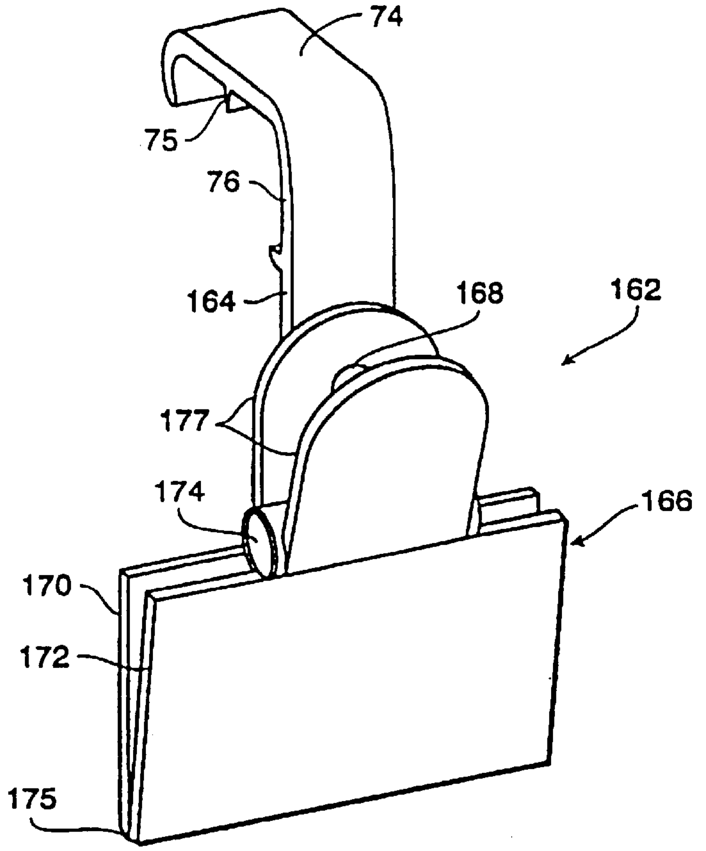
FIG. 9 is a perspective view of a Coupon Clip in accordance with a preferred form of the present invention.

Turning now to FIG. 9, a Coupon Clip 162 comprises a grip 74 having a spike-shaped slide stop 75, substantially as described above. The Coupon Clip 162 further comprises a grip extension 164 that extends substantially outwardly from, and in the same plane as, the front extension 76 of the grip 74. A butterfly clamp 166 is attached to the grip extension 164 by a rivet 168 in a manner well known in the art. The clamp 166 is attached to the grip extension 164 by the rivet 168 such that the clamp 166 is able to freely rotate about the axis defined by the rivet 168. As described more fully below, the clamp 166 is capable of holding coupons, photographs, or other similar materials. Accordingly, when the grip 74 of the Coupon Clip 162 is attached to a frame, the Coupon Clip is capable of holding such materials in a close relation to the frame.

The clamp 166 is of a butterfly-type well known in the art, comprising a first portion 170 and a second portion 172, each connected to a shaft 174. A spring (not shown in the Figures) provides a force biasing the jaws 175 of the clamp 166 in the closed position shown in FIG. 9. When pressure is applied to the handle portions 177 of the first portion 170 and second portion 172, the jaws 175 of the clamp 166 are opened to allow materials such as coupons, photographs, or other similar items to be inserted into or removed from the clamp 166.

Figure 10:
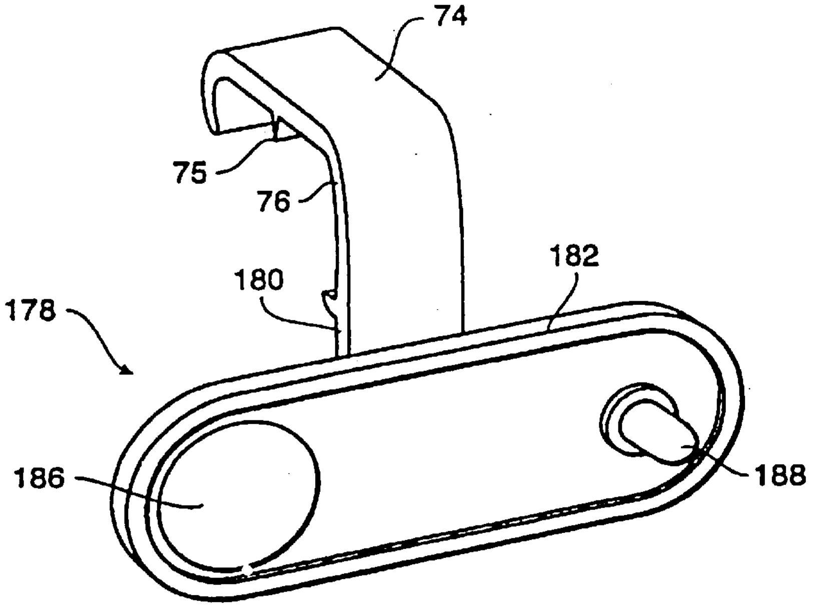
FIG. 10 is a perspective view of an Message Notification Unit in accordance with a preferred form of the present invention.

Turning now to FIG. 10, a Message Notification Unit 178 comprises a grip 74 having a spike-shaped slide stop 75, substantially as described above. The Message Notification Unit 178 further comprises a grip extension 180 that extends substantially outwardly from, and in the same plane as, the front extension 76 of the grip 74. An oval-shaped body portion 182 of the Message Notification Unit 178 is attached to the grip extension 180 by a rivet (not shown) in a manner well known in the art. The body portion 182 is attached to the grip extension 180 by the rivet such that the body portion 182 is able to freely rotate about the axis defined by the rivet. Although a rivet connection is described here, those skilled in the art will recognize that other connection mechanisms are possible, such as a screw connection or other similar mechanisms that provide the capability to rotate the body portion 182 about an axis. Accordingly, the Message Notification Unit 178 is capable of being attached to any side of a frame, and the body portion 182 oriented in any direction desired. Alternatively, the body portion 182 may be fixedly connected to the grip extension 180 by a rivet, screw, adhesive or the like such that the body portion 182 does not rotate.

An on/off switch 186 and flashing light 188 are fixed to the front side of the body portion 182, facing away from the grip 74. The on/off switch 186 is a membrane on/off switch that is well known in the art. The flashing light 188 is a battery-powered (battery not shown) LED indicator that is activated by the on/off switch 186, also in a manner well known in the art. The Message Notification Unit 178 so described is suitable for use by placement in a conspicuous location and activating the flashing light 188 when it is desired to attract another user's attention. As an example, which is not intended to limit the present description, the Message Notification Unit 178 may be attached to the frame of a message board to alert a user that a message is written on the board.

Figure 11A:
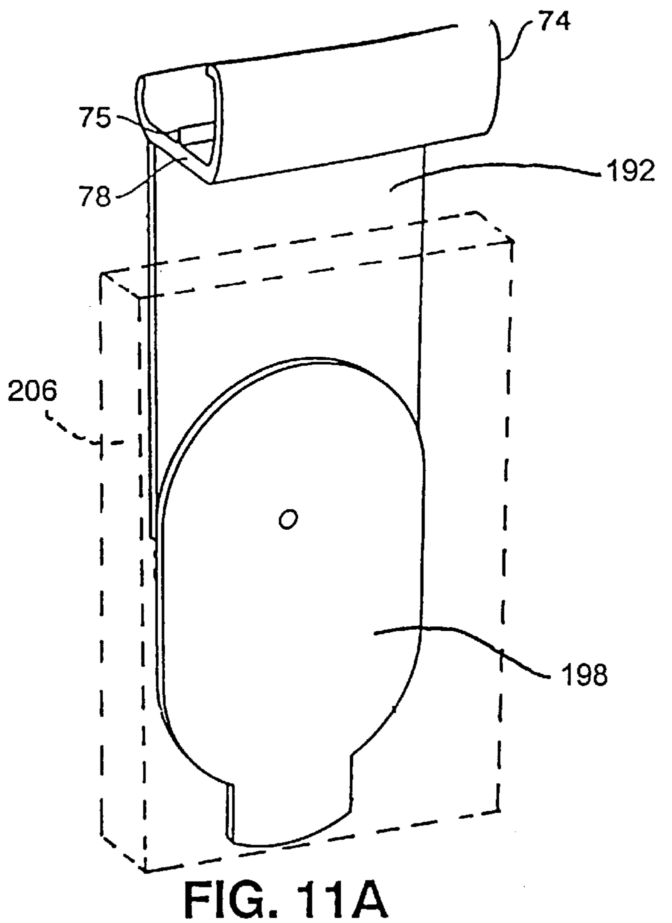
FIG. 11A is a front perspective view of a Clip-on Calculator in accordance with a preferred form of the present invention.
Figure 11B:
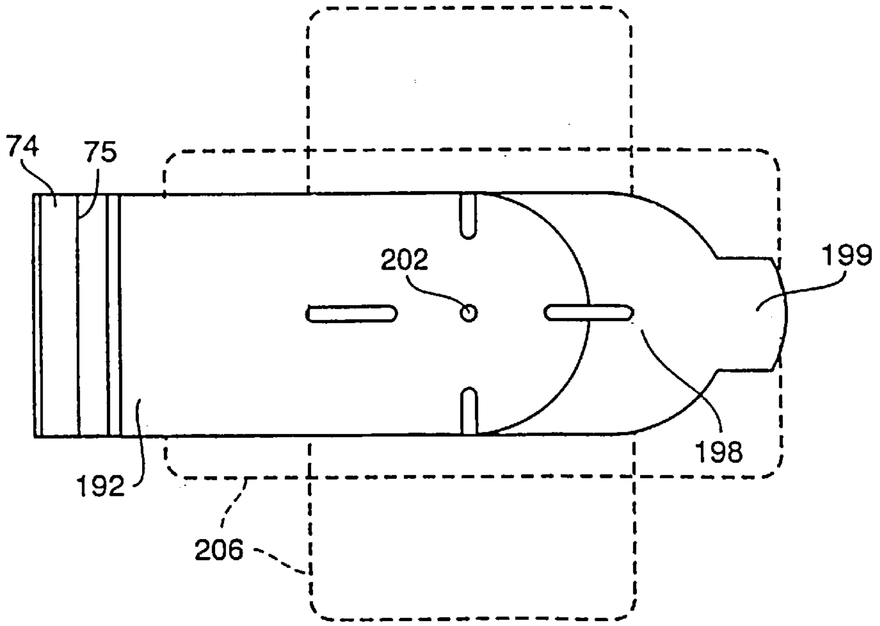
FIG. 11B is a bottom view of the Clip-on Calculator of FIG. 11A.
Figure 11C:
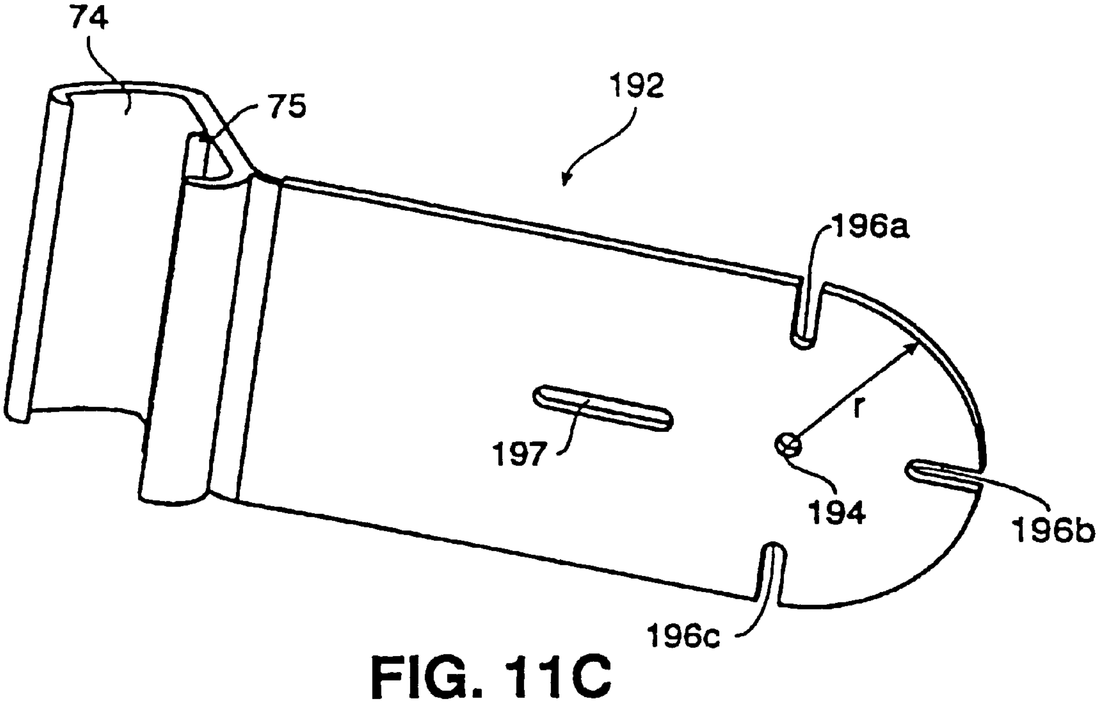
FIG. 11C is a perspective view of a base portion of the Clip-on Calculator of FIG. 11A.

Turning now to FIGS. 11A–D, a Clip-on Calculator 190 comprises a grip 74 having a spike-shaped slide stop 75, substantially as described above. The Clip-on Calculator 190 further comprises a base 192 that extends outwardly from, and substantially perpendicular to, the end extension 78 of the grip 74. As best seen in FIGS. 11B and 11C, the base 192 is substantially rectangular in shape but is arcuate at its end opposite the grip 74, defining a radius r. A hole 194 is formed in the base 192 at the point defined by the center of the radius r. Three half-slots 196*a–c* are formed in the base 192 at 90° intervals about the periphery defined by radius r. A full-slot 197 is formed in the base 192 such that the center of the full-slot 197 is a distance r from the center of the hole 194, and the full-slot 197 is spaced 90° from two of the half-slots 196*a* and 196*c*, and 180° from the third half-slot 196*b*.

Figure 11D:
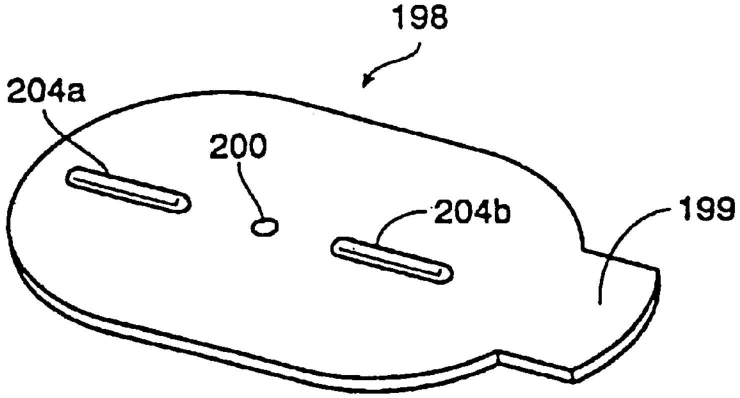
FIG. 11D is a perspective view of a back plate portion of the Clip-on Calculator of FIG. 11A.

As best seen in FIGS. 11A, 11B and 11D, a back plate 198 having a hole 200 at its center is attached to the base 192 by a rivet 202. The back plate 198 is generally oval-shaped, having a tab 199 at one end of the oval. The back plate 198 is attached to the base 192 with the rivet 202 such that the back plate 198 is able to rotate relative to the base 192 about the axis defined by the rivet 202. Though a rivet 202 is shown and described, it is understood that other attachment mechanisms are possible, such as a screw or the like. The back plate 198 has two alignment/support ribs 204*a* and 204*b* formed on its back side, with each rib 204*a*, 204*b* adapted to engage one of the three half-slots 196*a–c* or the full-slot 197 of the base 192. Accordingly, the back plate 198 may be selectively placed in any of four positions relative to the base 192, the four positions spaced at 90° intervals. Those skilled in the art will recognize that more (e.g., three or four) or fewer (e.g., one) support ribs may be provided while still providing the alignment mechanism so described, or that alternative alignment mechanisms are possible. A calculator 206 is attached to the back plate 198 on the side of the back plate 198 opposite the alignment/support ribs 204*a–d*. Alternatively, a clock (not shown) or other similar device may be attached to the back plate 198 instead of the calculator 206. Accordingly, the grip 74 of the Clip-on Calculator 190 may advantageously be attached to a message board or other member such that the calculator 206, clock, or other similar device is provided in a location for ease of use.

Figure 12A:
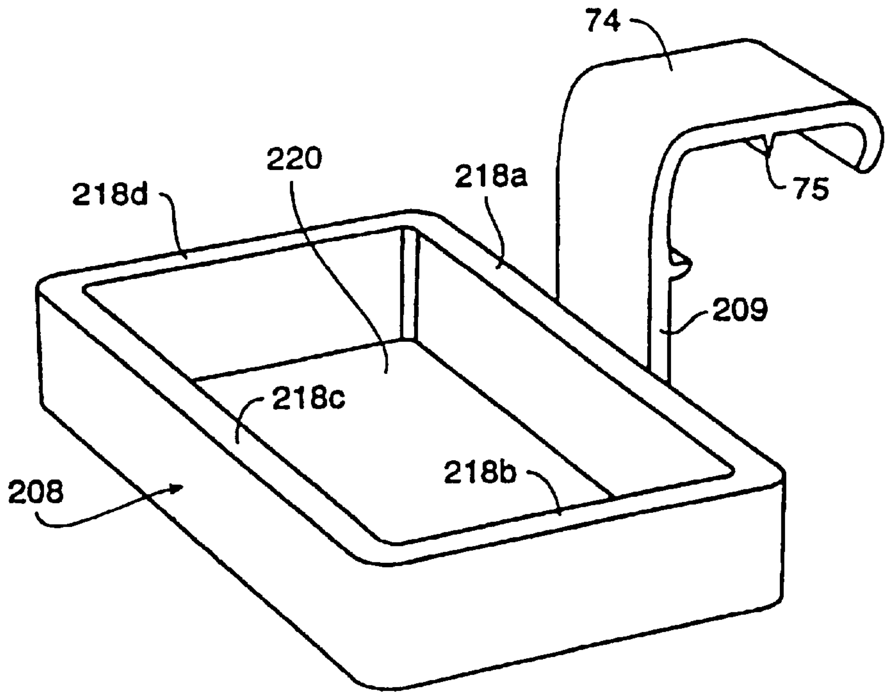
FIG. 12A is a perspective view of a Tray in accordance with a preferred form of the present invention.
Figure 12B:
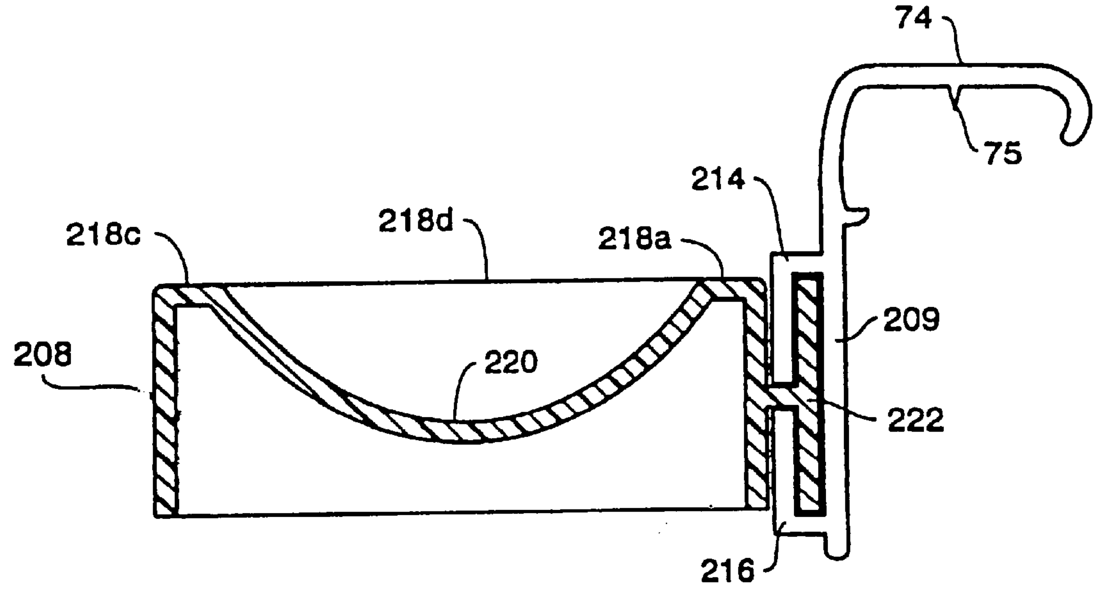
FIG. 12B is a cross-section view of the Tray of FIG. 12A.

Turning now to FIGS. 12A–B, a Tray 208 comprises a grip 74 having a spike-shaped slide stop 75, substantially as described above. The Tray 208 further comprises a grip extension 209 that extends substantially outwardly from, and in the same plane as, the front extension 76 of the grip 74. A T-groove assembly for attaching the Tray 208 to the grip 74 is provided on an external surface of the grip extension 209. The T-groove assembly comprises a groove defined by a top groove portion 214 and a bottom groove portion 216. The top groove portion 214 is formed integrally with and extends outwardly and downwardly from the surface of the grip extension 209. The bottom groove portion 216 is also formed integrally with the grip extension 209 and extends outwardly and upwardly from the surface of the grip extension 209. As noted above, the top groove portion 214 and bottom groove portion 216 together define a groove. Advantageously, the groove is symmetrical with respect to the top groove portion 214 and bottom groove portion 216.

The Tray 208 is generally rectangular and is defined by four walls 218*a–d* and a bowl 220 to hold items such as paper clips, rubber bands, coins, or the like. A "T"-extension 222 is formed integrally on the exterior of one of the walls 218*a* of the Tray 208. The "T"-extension is "T"-shaped, such that it is adapted to engage the groove formed on the surface of the grip extension 209. The Tray 208 is thereby attached to the grip 74 by the interaction of the "T"-extension 222 and the groove, while the grip 74 is able to engage a frame as described previously. Thus, the Tray 208 is able to be attached to a frame or other similar member. Moreover, because the groove is symmetrical, the Tray 208 is able to be attached to the grip 74 in either of two positions oriented 180° with respect to each other. This provides the ability to mount the Tray 208 on either the top or bottom of a frame.

Figure 13:
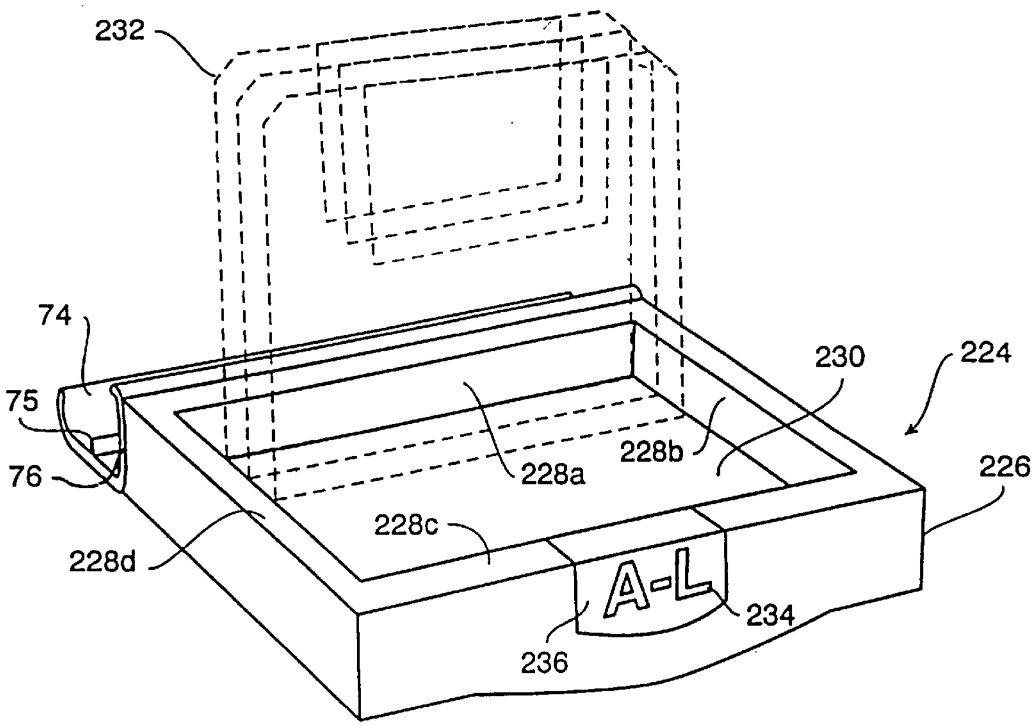
FIG. 13 is a perspective view of a Diskette/Card Holder in accordance with a preferred form of the present invention.

Turning now to FIG. 13, a Diskette/Card Holder 224 comprises a grip 74 having a spike-shaped slide stop 75, substantially as described above. The Diskette/Card Holder 224 further comprises a box 226 formed integrally with the external surface of the front extension 76 of the grip 74. The box 226 comprises four side walls 228*a–d* and a bottom 230 which together define a storage area that is advantageously sized to be capable of retaining one or more diskettes 232 as shown. Alternatively, the storage area may be sized so as to retain business cards, index cards, recipes, or other similarly shaped items. The height of the side walls 228*a–d* may be varied to accommodate any number of different types of items to be stored. Moreover, the shape of the box 226 may be varied as well from the generally rectangular shape shown in FIG. 13 to square, circular, oval, triangular, or other shapes.

A label 234 may optionally be provided on a surface of the box 226 of the Diskette/Card Holder. The label 234 may comprise a permanent mark such as a stamp, a removable paper label, a dry erase surface, or other similar form. A transparent cover 236 may be provided to protect the label 234 from erasure or damage. Accordingly, the grip 74 of the Diskette/Card Holder 224 may be attached to a frame or other member in order to provide a storage area for diskettes, cards or the like in a convenient location.

Figure 14:
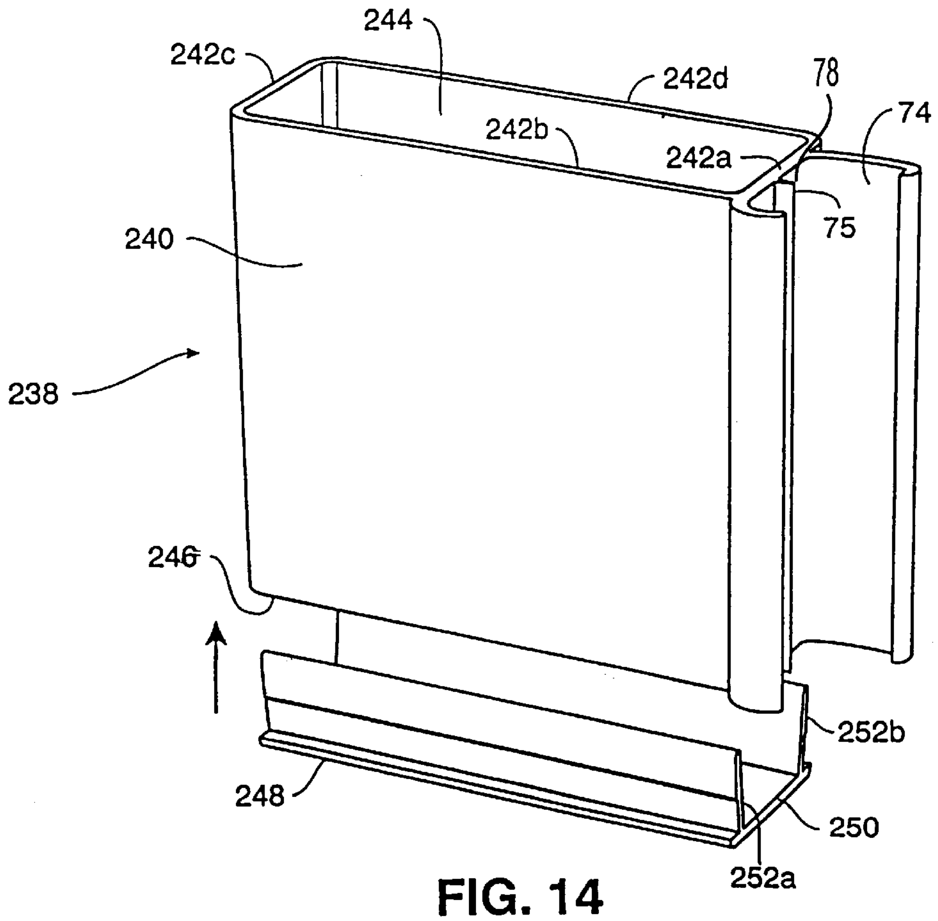
FIG. 14 is a perspective view of a Pen Cup in accordance with a preferred form of the present invention.

Turning now to FIG. 14, a Pen Cup 238 comprises a grip 74 having a spike-shaped slide stop 75, substantially as described above. The Pen Cup 238 further comprises a generally rectangular housing 240 formed integrally with the external surface of the end extension 78 of the grip 74. The housing 240 comprises four sides 242*a–d*, one such side 242*a* being coextensive with the end extension 78 of the grip 74. In the embodiment shown in FIG. 14, the housing 240 is hollow and open on both its top and bottom ends, thus forming a top opening 244 and a bottom opening 246. Alternatively, in an embodiment not shown, a base may be integrally formed with the housing 240 to cover the bottom opening 246.

A cap 248 is adapted to snap into either the top opening 244 or bottom opening 246 of the housing 240. The cap 248 comprises a flat bottom portion 250 that is substantially the same size as the top opening 244 and bottom opening 246 of the housing 240. The cap 248 is provided with two side portions 252*a–b* each formed integrally with the base portion. Each side portion 252*a–b* is formed a small distance inside the edge of the base portion, and each side portion 252*a*–b extends upward at a slight angle from perpendicular relative to the bottom portion 250. The slight angle is outward, or away from the other side portion. Accordingly, when the cap 248 is inserted into the bottom opening 246 or top opening 244 of the housing 240, the side portions 252*a–b* exert an outward force pressing against the interior surfaces of the housing 240 to provide a friction fit retaining the cap 248 on the housing 240. If the cap 248 is inserted into the bottom opening 246 of the housing 240, the cap 248 serves as a bottom surface of the Pen Cup 238 to prevent pens or other items from simply falling through the housing 240. Alternatively, if the cap 248 is inserted in the top opening 244 of the housing 240, the cap 248 serves as a lid of the Pen Cup 238. Accordingly, the grip of the Pen Cup 238 may be attached to the frame or other similar member to provide a readily accessible storage area for pens, pencils, or other items.

Figure 15:
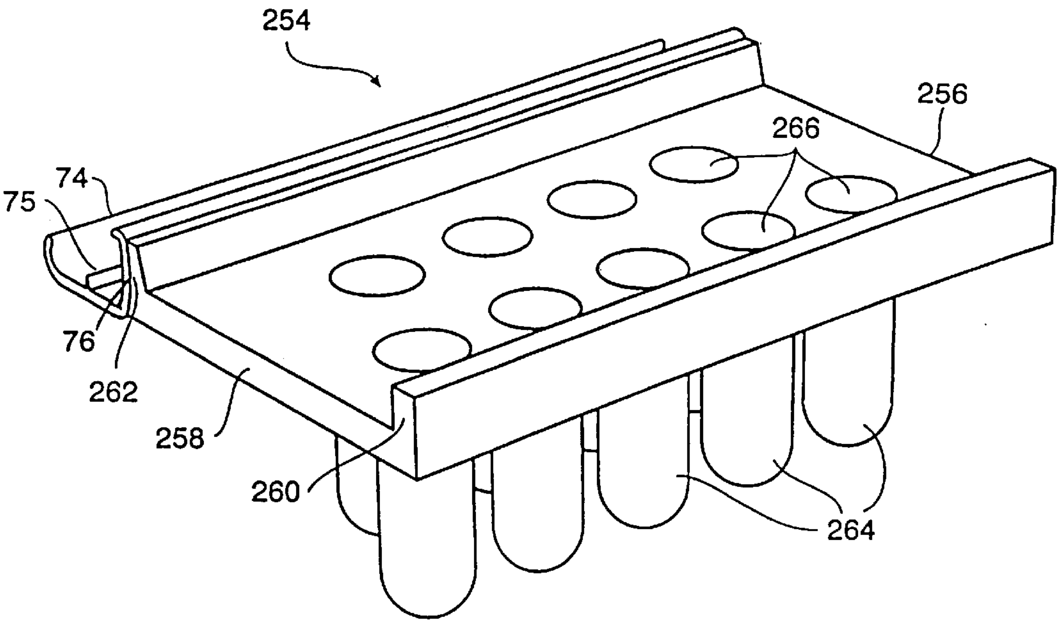
FIG. 15 is a perspective view of a Pen Holder in accordance with a preferred form of the present invention.

Turning now to FIG. 15, a Pen Holder 254 comprises a grip 74 having a spike-shaped slide stop 75, substantially as described above. The Pen Holder 254 further comprises a top portion 256 formed integrally with the front extension 76 of the grip 74. The top portion 256 comprises a flat member 258, a front edge 260 and a back edge 262. The back edge 262 extends generally perpendicularly from the flat member 258, and is the part of the top portion 256 that is formed integrally with the front extension 76 of the grip 74. The front edge 260 also extends generally perpendicularly from the flat member 258 and is formed at the opposite edge of the flat member 258 from the back edge 262.

A plurality of tubes 264 is formed integrally with and extend below the bottom surface of the flat member 258, and a hole 266 is formed in the flat member 258 at the location of each of the plurality of tubes 264. Each of the holes 266 in the flat member 258 and its corresponding tube 264 cooperate to form a storage area that is capable of storing pens, pencils or similar items. Accordingly, the grip 74 of the Pen Holder 254 may be attached to a frame or similar member to provide the capability of storing pens, pencils, or the like in a convenient manner.

Figure 16A:
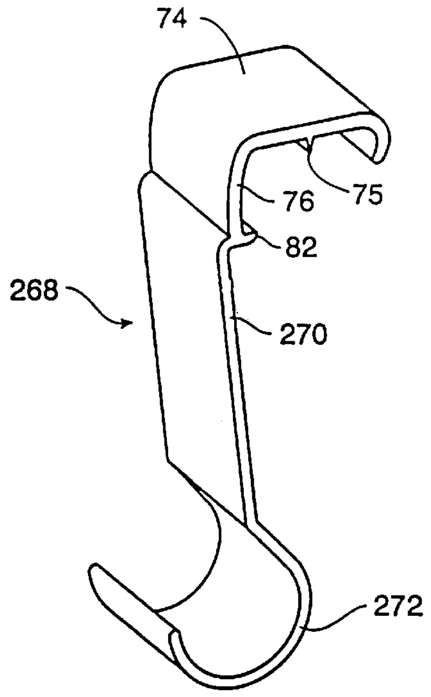
FIG. 16A is a perspective view of a Multi-Purpose Hook in accordance with a preferred form of the present invention.

Turning now to FIG. 16A, a Multi-Purpose Hook 268 comprises a grip 74 having a spike-shaped slide stop 75, substantially as described above. The Multi-Purpose Hook 268 further comprises a grip extension 270 formed integrally with and extending outwardly and downwardly from the front extension 76 of the grip 74. The grip extension 270 is attached to the external surface of the front extension 76 at a point near the tip 82. A "C"-shaped hook 272 is formed integrally with and at the end of the grip extension 270. The hook 272 is advantageously oriented to provide a mechanism for attaching items to a message board or the like when the grip 74 of the Multi-Purpose Hook 268 is attached to the message board, as more fully described below.

Figure 16B:
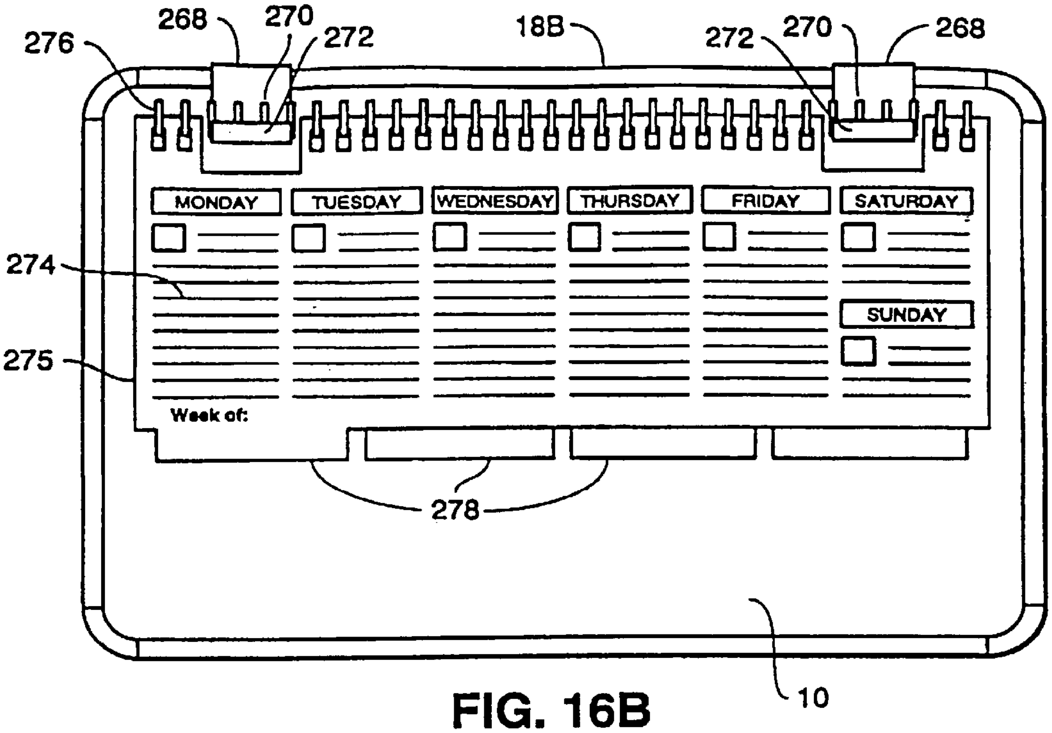
FIG. 16B is a front view of Calendar retained on a message board by a pair of Multi-Purpose Hooks in accordance with a preferred form of the present invention.

Turning to FIG. 16B, a pair of Multi-Purpose Hooks 268 are shown attached to a message board. Although not clearly shown in FIG. 16B, the grip 74 of each Multi-Purpose Hook 268 is attached to the top frame section 18*b* of the message board in a manner similar to that described elsewhere in this specification. The grip extension 270 of each of the Multi-Purpose Hooks 268 extends over the front surface of the message board such that each hook 272 is oriented as shown in the Figure. A calendar 274 having a double spiral binding 276 rests on the hooks 272 of the Multi-Purpose Hooks 268 such that the calendar 274 is retained on the front surface of the message board.

The calendar 274 comprises a plurality of sheets 275 bound together by a double spiral binding 276, each sheet 275 may optionally be provided with a tab 278. The double spiral binding 276 may comprise a metal or plastic wire or other suitable material. The sheets 275 of the calendar 274 may comprise paper, card stock, or other similar material. In a preferred form, the sheets 275 comprise a dry erase material. The double spiral binding 276 allows the user to rotate each sheet 275 around the binding to reveal the next sheet. Accordingly, a daily, weekly or monthly calendar may be displayed. The calendar 274 shown in FIG. 16B is intended for exemplary purposes only, it being understood that sheets 275 containing other information can alternatively be displayed.

Figure 17:
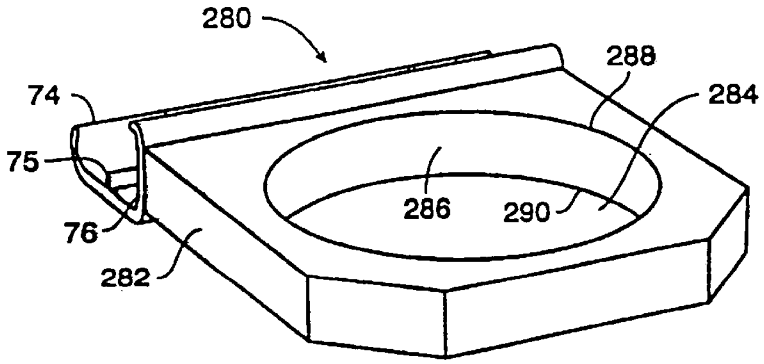
FIG. 17 is a perspective view of a Cup Holder in accordance with a preferred form of the present invention.
Figure 18A:
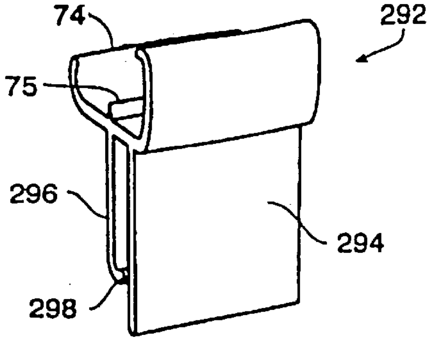
FIG. 18A is a perspective view of a Fabric Clip in accordance with a preferred form of the present invention.
Figure 18B:
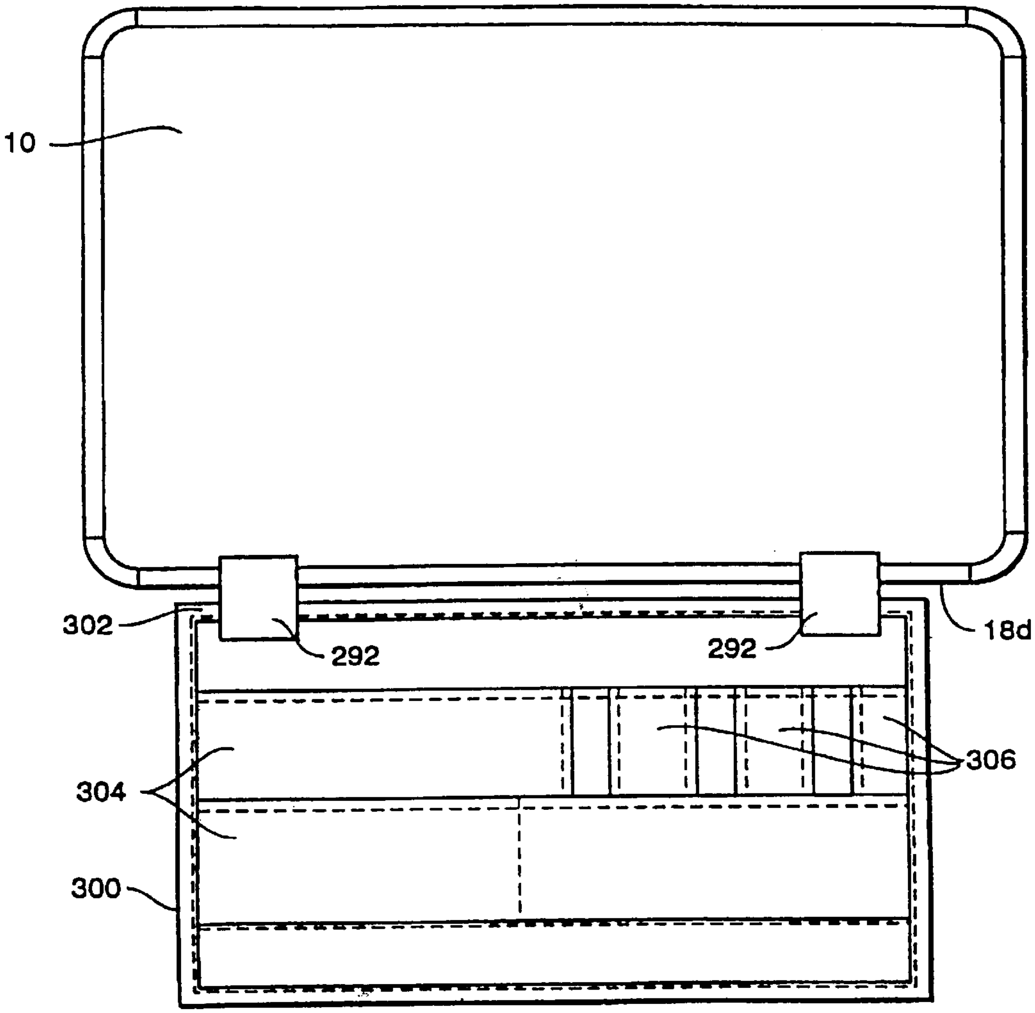
FIG. 18B is a front view of a Pouch retained on a message board by a pair of Fabric Clips in accordance with a preferred form of the present invention.

Turning now to FIG. 17, a Cup Holder 280 comprises a grip 74 having a spike-shaped slide stop 75. The Cup Holder 280 further comprises a body portion 282 formed integrally with the external surface of the front extension 76 of the grip 74. The body portion 282 is generally square or rectangular in shape, however, the corners may be angled as shown in the Figure. Other variations in the overall shape of the Cup Holder 280 are also possible.

As shown in FIG. 17, a relatively large hole 284 is formed at the center of the body portion 282. The hole 284 is adapted to receive and retain a cup, can or other similar object that is set within the hole 284. Advantageously, the sides 286 of the hole 284 may be inclined such that the diameter of the hole 284 at its top edge 288 is slightly larger than the diameter of the hole 284 at its bottom edge 290. The surfaces of the body portion 282 defining the hole 284, i.e., the sides 286, may also be covered with rubber, vinyl, or other material to enhance the holding capability of the Cup Holder 280.

Turning now to FIG. 18A, a Fabric Clip 292 comprises a grip 74 having a spike-shaped slide stop 75, substantially as described above. The Fabric Clip 292 further comprises a front extension 294 and a rear extension 296, each of which is formed integrally with the grip 74 and each of which extends substantially perpendicularly from the external surface of the end extension 78 of the grip 74. The rear extension 296 is formed on the end extension 78 of the grip 74 at a point nearer to the lip 84 than the front extension 294, which is formed nearer to the connecting portion 80 of the grip 74. The rear extension 296 has a hook 298 formed on its end opposite the grip 74 which is adapted to receive and retain a fabric portion of a pouch or other member, as more fully discussed below.

In FIG. 18B, there is shown a Pouch 300 retained on a message board by a pair of Fabric Clips 292. The top edge 302 of the Pouch 300 is held between the front extension 294 and rear extension 296 by the hook 298 of each Fabric Clip 292, while the grip 74 of each Fabric Clip 292 is attached to the bottom frame section 18*d* of the message board. The Pouch 300 may comprise cotton, nylon, or other durable fabric and is preferably made with pockets of one or more sizes. For example, large pockets 304 may be formed to retain business cards, index cards, or small items such as paper clips, tacks, or the like. Relatively long, thin pockets 306 may be formed to retain pens or pencils. Other and further variations are possible.

Figure 19:
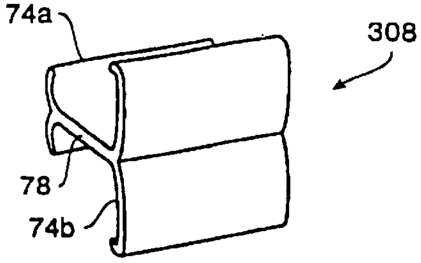
FIG. 19 is a perspective view of an Edge Joiner in accordance with a preferred form of the present invention.

Turning now to FIG. 19, an Edge Joiner 308 essentially comprises a pair of grips 74*a–b* formed back-to-back and integrally with each other such that they each share a single end extension 78. Accordingly, a first grip 74*a* of the pair of grips may be attached to a frame section of a first message board, while a second grip 74*b* of the pair of grips is attached to a frame section of a second message board such that the two message boards are joined together by the Edge Joiner 308.

While the above description contains many specificities, these should not be construed as limitations on the scope of the invention, but rather as an exemplification of preferred embodiments thereof. Other variations are possible.

Accordingly, the scope of the present invention should be determined not by the embodiments illustrated above, but by the appended claims and their legal equivalents.

What is claimed is:

1. An object holder for a message board, comprising:

a retaining grip detachably mountable to an edge of a message board, an elongate rear member extending from a portion of said retaining grip, a pair of side members extending from said elongate rear member, a front member extending from each of said pair of side members, and a bottom member attached to one or more of said elongate rear member, said pair of side members, and said front member, wherein said elongate rear member, said pair of side members, said front member, and said bottom member define a cavity for retaining one or more objects therein.

2. The object holder of claim 1, wherein said retaining grip comprises a flexible, resilient material.

3. The object holder of claim 1, wherein said retaining grip, said elongate rear member, said pair of side members, and said front member are integrally formed together.

4. The object holder of claim 1, wherein said retaining grip, said elongate rear member, said pair of side members, and said front member comprise plastic.

5. The object holder of claim 1, wherein said retaining grip has a substantially “C” shape for detachably engaging the edge of the message board.

6. The object holder of claim 1, wherein the message board includes front and rear channels extending along the edge of the message board, and wherein said retaining grip comprises front and rear portions for detachably engaging the front and rear channels.

7. The object holder of claim 6, wherein said front and rear portions of said retaining grip include a lip and a tip extension for engaging the front and rear channels formed in a frame extending along the edge of the message board.

8. The object holder of claim 1, wherein said elongate rear member, said pair of side members, and said front member define a housing, and wherein said bottom member is detachable from said housing.

9. The object holder of claim 3, wherein said elongate rear member, said pair of side members, and said front member define a housing, and wherein said bottom member is detachable from said housing.

10. The object holder of claim 8, wherein said elongate rear member includes a cap comprising a flat base and two side extensions adapted to engage said housing.

11. The object holder of claim 9, wherein said bottom member includes a cap comprising a flat base and two side extensions adapted to engage said housing.

12. A object holder comprising:

a housing having a top opening and a bottom opening, a detachable cap attached to one of said top opening or said bottom opening, and a retaining grip attached to said housing, said retaining grip being detachably mountable to an edge of a message board.

13. The object holder of claim 12, wherein said housing is generally rectangular in shape.

14. The object holder of 12, wherein said retaining grip comprises a flexible, resilient material.

15. The object holder of claim 12, wherein said retaining grip, said housing, and said detachable cap are integrally formed together.

16. The object holder of claim 12, wherein said retaining grip, said housing, and said detachable cap comprise plastic.

17. The object holder of claim 12, wherein said retaining grip has a substantially “C” shape for detachably engaging the edge of the message board.

18. The object holder of claim 1, wherein the message board includes front and rear channels extending along the edge of the message board, and wherein said retaining grip comprises front and rear portions for detachably engaging the front and rear channels.

19. The object holder of claim 17, wherein said front and rear portions of said retaining grip include a lip and a tip extension for engaging the front and rear channels formed in a frame extending along the edge of the message board.

20. The object holder of claim 12, wherein said detachable cap comprises a flat base and two side extensions adapted to engage said housing.

21. The object holder of claim 1, wherein the elongate rear member extends coextensive with a portion of said retaining grip.

22. The object holder of claim 1, wherein the pair of side members extend substantially perpendicularly from the rear member, and the front member extends substantially perpendicularly from the pair of side members.

* * * * *